United States Patent [19]

Zimmer

[11] Patent Number: 5,328,940
[45] Date of Patent: Jul. 12, 1994

[54] RADIATION-CURABLE COMPOSITIONS CONTAINING HYDROXY-TERMINATED POLYURETHANES AND AN EPOXY COMPOUND

[75] Inventor: David J. Zimmer, Erie, Pa.

[73] Assignee: Lord Corporation, Erie, Pa.

[21] Appl. No.: 917,566

[22] Filed: Jul. 20, 1992

[51] Int. Cl.$^5$ .............. C08F 2/50; C09J 163/00; C09J 175/06; C09J 175/08

[52] U.S. Cl. .................... 522/31; 522/170; 522/146; 522/174; 528/60; 528/405; 528/905

[58] Field of Search ............ 522/97, 146, 170, 174, 522/31; 528/60, 405, 905

[56] References Cited

U.S. PATENT DOCUMENTS

| | | | |
|---|---|---|---|
| 3,490,987 | 1/1970 | Bauriedel | 161/190 |
| 4,137,276 | 1/1979 | Sirota | 528/60 |
| 4,256,828 | 3/1981 | Smith | 430/280 |
| 4,593,051 | 6/1986 | Koleske | 522/31 |
| 4,599,401 | 7/1986 | Koleske | 528/408 |
| 4,698,408 | 10/1987 | Goel et al. | 528/60 |
| 4,812,488 | 3/1989 | Koleske et al. | 522/31 |
| 4,868,266 | 9/1989 | Meckel et al. | 528/60 |
| 4,873,307 | 10/1989 | Federici et al. | 528/60 |

Primary Examiner—Susan Berman
Attorney, Agent, or Firm—W. Graham Buie

[57] ABSTRACT

A radiation-curable composition containing an epoxy compound, a hydroxy-terminated polyurethane, and a photoinitiator. The curable composition exhibits a high green strength and excellent overall bonding capability and is particularly useful in laminating adhesive applications.

18 Claims, No Drawings

RADIATION-CURABLE COMPOSITIONS CONTAINING HYDROXY-TERMINATED POLYURETHANES AND AN EPOXY COMPOUND

FIELD OF THE INVENTION

The present invention relates to radiation-curable compositions which are useful as laminating adhesives. More specifically, the present invention relates to a radiation-curable composition which is based on epoxy compounds and hydroxy-terminated polyurethanes and which exhibits excellent green strength and overall bonding capability in laminating adhesive applications.

BACKGROUND OF THE INVENTION

The flexible food packaging industry is currently experiencing relatively substantial growth due to the increasing popularity of ready-to-eat and microwaveable foods and drinks which appear to spontaneously multiply on our grocers' shelves. The flexible food packaging utilized in these popular products is typically comprised of a laminate of various polymeric films and/or metal foils. The utilization of a combination of polymeric films and metal foils allows a package to be designed so as to take advantage of the various desirable properties of the films and foils such as permeability, heat resistance and the like. The various films and foils are typically combined into a laminate by utilizing an adhesive to bond the layers of materials together.

Adhesives utilized for the manufacture of these high performance, flexible food packaging laminates have previously been based on conventional two-part urethane adhesive systems. These urethane adhesives are relatively difficult to work with since they require the mixing of two separate parts and since they typically have a limited potlife or storage capability. The urethane adhesives also typically utilize undesirable volatile organic solvents and require an extended cure cycle in order to fully develop the ultimately desired properties.

Although not previously disclosed as being useful for laminating adhesives, various photocopolymerizable compositions containing epoxy compounds have been previously described in the patent literature. For example, U.S. Pat. No. 4,256,828 discloses photocopolymerizable compositions containing epoxides, an organic material with hydroxyl functionality, and a photosensitive aromatic sulfonium or iodonium salt of a halogen-containing complex ion. The epoxide can be a cycloaliphatic epoxide while the hydroxy-functional materials can be alkanols, alkylene glycols, polyoxyalkylene glycols and triols, hydroxyl-terminated vinyl acetate copolymers, hydroxyl-terminated polyvinylacetal resins, hydroxyl-terminated polyesters, hydroxyl-terminated polylactones and hydroxyl-terminated polyalkadienes.

Another example of a photocopolymerizable epoxy-based composition is described in U.S. Pat. No. 4,593,051. This patent describes photocopolymerizable compositions based on epoxide and polymer/hydroxyl-containing organic materials. The epoxide can be a cycloaliphatic epoxide resin while the polymer/hydroxyl-containing organic materials can be polyether polyols or a polymer-polyol dispersion prepared by the free-radical polymerization of acrylonitrile or a mixture of acrylonitrile and styrene in a polyoxyalkylene polyol containing unsaturation.

Various previously described photocopolymerizable compositions such as those disclosed above have been found by the present inventors to be ineffective when utilized as a laminating adhesive for flexible packaging materials. Specifically, the previous photocopolymerizable compositions have been found to not provide a level of bond strength or green strength (the ability to adhere and firmly hold together the materials to be bonded prior to cure) acceptable for an effective utilization in flexible packaging applications.

A need therefore exists for an adhesive composition which can be utilized as a laminating adhesive in a one-part system so as to provide acceptable adhesion and potlife or storage capability. Such an adhesive composition should also exhibit sufficient green strength and should avoid the use of volatile organic solvents.

SUMMARY OF THE INVENTION

The present invention is a one-part radiation-curable adhesive composition which provides high green strength and bonding capability when utilized in laminating adhesive applications. The adhesive of the present invention exhibits instantaneous cure, has indefinite potlife and avoids the use of volatile organic solvents. Specifically, the radiation-curable composition of the present invention comprises an epoxy compound, a hydroxy-terminated polyurethane, and a photoinitiator. It has presently been discovered that the utilization of the present hydroxy-terminated polyurethanes in combination with an epoxy compound results in a radiation-curable composition which is particularly useful for bonding flexible materials in the form of a laminate.

DETAILED DESCRIPTION OF THE INVENTION

The epoxy compound of the present invention can essentially be any compound that contains an epoxy group having the formula:

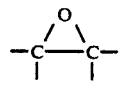

and has a viscosity of about 200 centipoise or higher at 25° C. Such materials, broadly called epoxides, include monomeric epoxides and epoxides of the polymeric type and can be aliphatic, cycloaliphatic, aromatic or heterocyclic. These materials generally have, on the average, at least 1.5 polymerizable epoxy groups per molecule (preferably two or more epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule. The "average" number of epoxy groups per molecule is determined by dividing the total number of epoxy groups in the epoxy-containing material by the total number of epoxy molecules present.

These epoxy-containing materials may vary from low molecular weight monomeric materials to high molecular weight polymers and may vary greatly in the nature of their backbone and substituent groups. For example, the backbone may be of any type and substituent groups thereon can be any group free of an active hydrogen atom which is reactive with an oxirane ring at room temperature. Illustrative of permissible substituent groups include halogens, ester groups, ethers, sulfonate groups, siloxane groups, nitro groups, phosphate groups, etc. The molecular weight of the epoxy-containing materials may vary from 58 to about 100,000 or more. Mixtures of various epoxy-containing materials can also be used in the compositions of this invention.

The epoxy compounds of the present invention may be cycloaliphatic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

Cycloaliphatic epoxides are preferred, in general, for use as the epoxy compound of the present invention. Preferred cycloaliphatic epoxides for use in the invention include 3,4-epoxycyclohexylmethyl-3,4-epoxycyclohexane carboxylate; bis(3,4-epoxycyclohexylmethyl)adipate; or mixtures thereof.

Further epoxy-containing materials which are useful in the practice of this invention include glycidyl ether monomers of the formula:

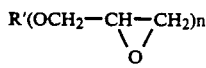

where R' is alkyl or aryl and n is an integer of 1 to 6. Examples are glycidyl ethers of polhydric phenols obtained by reacting a polyhydric phenol with an excess of chlorohydrin such as epichlorohydrin [e.g., the diglycidyl ether of 2,2-bis(2,3-epoxypropoxyphenol)-propane]. Further examples of epoxides of this type which can be used in the practice of this invention are described in U.S. Pat. No. 3,018,262, incorporated herein by reference, and in "Handbook of Epoxy Resins" by Lee and Neville, McGraw-Hill Book Co., New York, 1967.

There are a host of commercially available epoxy-containing materials which can be used in this invention. In particular, epoxides which are readily available include octadecylene oxide, epichlorohydrin, styrene oxide, vinyl cyclohexene oxide, glycidol, glycidylmethacrylate, diglycidyl ether of bisphenol A (e.g., those available under the trade designations EPON 828, EPON 1004 and EPON 1010 from Shell Chemical Co., DER-331, DER-332, and DER-334, from Dow Chemical Co.), vinylcyclohexene dioxide (e.g., ERL-4206 from Union Carbide Corp.), 3,4-epoxycyclohexylmethyl-3,4-epoxycyclohexene carboxylate (e.g., ERL-4221 from Union Carbide Corp.), 3,4-epoxy-6-methylcyclohexylmethyl-3,4-epoxy-6-methylcyclohexene carboxylate (e.g., ERL-4201 from Union Carbide Corp.), bis(3,4-epoxy-6-methylcyclohexylmethyl) adipate (e.g. ERL-4289 from Union Carbide Corp.), bis(2,3-epoxycyclopentyl) ether (e.g., ERL-0400 from Union Carbide Corp.), aliphatic epoxy modified with polypropylene glycol (e.g., ERL-4050 and ERL-4052 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, flame retardant epoxy resins (e.g., DER-580, a brominated bisphenol type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether (e.g., KOPOXITE from Koppers Company, Inc.).

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

The hydroxy-terminated polyurethane of the present invention is typically prepared by the reaction of at least one compound selected from the group consisting of polyesters and polyethers having a molecular weight of about 300 to about 10,000, preferably about 800 to 5,000, and having at least two hydroxy groups with less than molar amounts of a low molecular weight diisocyanate in a molar ratio of hydroxy group to isocyanate group ranging from about 1.01:1 to 3:1, preferably from about 1.2:1 to 2.2:1. Hydroxy-terminated polyurethanes are also available commercially from Lord Corporation under the tradename TYCEL.

Suitable polyesters useful for the preparation of the hydroxy-terminated polyurethanes are prepared by esterification of dicarboxylic acids or transesterification of methyl esters of dicarboxylic acids with a dihydroxy compound. Examples of suitable dicarboxylic acids are aliphatic acids such as adipic acid, glutaric acid, pimelic acid, etc.; aromatic acids such as phthalic acid, terephathalic acid, naphthalene dicarboxylic acid, etc.; cycloalkyl acids such as cyclohexane dicarboxylic acid; unsaturated acids such as maleic acid, fumaric acid, hexene dicarboxylic acid, etc.; acids containing hetero atoms such as O, S, or N, such as diglycolic acid, ethylether-2,2'-dicarboxylic acid, thiodiglycolic acid, etc.

The dihydroxy compounds useful for preparing polyesters have 2 to 8 carbon atoms and may be aliphatic such as ethylene glycol, propylene glycol, butylene-1,3-diol, butylene-1,4-diol, butylene-2,3-diol, 2,2-dimethylpropane-1,3-diol (neopentylglycol), 2,2-diethylpropane-1,3-diol, 2-methyl-2-propylpropane-1,3-diol, isomeric octanediols, etc.; unsaturated dihydroxy compounds such as heptenediol, butynediol, etc.; and dihydroxy compounds containing N, O or S hetero atoms such as diethylene glycol, triethylene glycol, thioethylene glycol, diethanolamine, N-methyl diethanolamine, etc.

The polyethers can be made in a known manner by splitting water from a dihydroxy or trihydroxy compound of 2 to 8, particularly 2 to 4, carbon atoms or by ring opening polymerization of an alkylene oxide. The dihydroxy compounds may be the same as the compounds discussed above for the formation of polyesters. The trihydroxy compounds may be any of the trihydroxy compounds typically utilized in the preparation of polyethers. Examples of trihydroxy compounds include trimethylolyl propane, glycerol, and hexanetriol. Examples of suitable alkylene oxides are ethylene oxide, propylene oxide, tetrahydrofuran, and the like.

The low molecular weight diisocyanates may be aliphatic or aromatic and may have 6 to 40 carbon atoms. Examples of suitable diisocyanates are hexane-1,6-diisocyanate, decane-1,10-diisocyanate, diisocyanates derived from dimerized fatty acids, phenylene-1,4-diisocyanate, toluene-2,4-diisocyanate, toluene-2,6-diisocyanate, naphthylene-1,5-diisocyanate, diphenylmethane-4,4'-diiosycanate, diphenyl-methane-3,3'-methoxy-4,4'-diisocyanate, etc.

The epoxy compound and the hydroxy-terminated polyurethane of the invention are typically utilized in an epoxy:hydroxy functional ratio ranging from about 1:1 to 20:1, preferably from about 1:1 to 7:1.

The photoinitiator of the present invention may be any one of the well-known photoinitiators such as those described in, for example, U.S. Pat. Nos. 4,231,951; 4,256,828; 4,138,255; 4,058,401 and 4,069,055; all of which are incorporated herein by reference. Preferred photoinitiators include triarylsulfonium complex salts as described in U.S. Pat. No. 4,231,951, aromatic sulfonium or iodonium salts of halogen-containing complex ions as described in U.S. Pat. No. 4,256,828; aromatic onium salts of Group VIa elements as described in U.S. Pat. Nos. 4,058,401 and 4,138,255; aromatic onium salts of Group Va elements as described in U.S. Pat. No. 4,069,055. Such salts are commercially available as FC-508 and FC-509 (available from Minnesota Mining and Manufacturing Company), and as UVE-1014 (available from General Electric Company). The photoinitiator is typically utilized in an amount ranging from about 1 to 10, preferably from about 1 to 5, percent by weight of the radiation-curable composition.

The radiation-curable adhesives compositions of the present invention may optionally contain dyes, flow control agents, thickeners and the like, as is known in the art. The compositions are typically prepared by combining the ingredients and mixing by hand, mechanical stirrer or the like at ambient or slightly elevated temperature until a homogeneous mixture is achieved.

The present radiation-curable adhesive compositions may be utilized in combination with conventional laminating machines to bond multiple layers of various materials by techniques well known in the art. One particularly useful method of applying the composition involves a process known as wet bond laminating where the adhesive composition is coated onto a polymeric film or metal foil web by a laminating machine using a gravure or smooth roll technique. The coated web is then run into a zone of ultraviolet (UV) radiation delivered by medium pressure mercury vapor lamps to initiate polymerization. The web is then laminated or nipped by a roller to a second film or foil web before polymerization is complete. Polymerization is then allowed to continue so as to bond the materials together in the form of a laminate. If one of the materials to be bonded is transparent, the two materials can be nipped or laminated with the adhesive prior to exposure to UV radiation. The UV radiation is then applied through the transparent material so as to initiate polymerization of the adhesive between the materials.

The radiation-curable adhesive compositions can be applied to essentially any material capable of receiving the compositions. The compositions are preferably utilized with film-like materials which can be adhered together in the form of a laminate. Examples of materials capable of being bonded with the present adhesive compositions include paper, cellulose hydrate or plastics, such as polyethylene, polypropylene, polyterephthalate, polyvinyl chloride, copolymers of vinylchloride and vinylidene chloride, copolymers of vinyl acetate with low olefins, polyamides, rubber hydrochloride or metal foils made of aluminum, tin, lead, copper, etc. The adhesive compositions are preferably used for the production of compound films, particularly compound films of two or more materials selected from polyethylene, polypropylene, linear polyester, aluminum, paper and cellulose hydrate.

Although preferred for use as a laminating adhesive, the adhesive composition of the present invention may also be utilized as any type of adhesive, coating, carrier vehicle, particle binder, or the like.

The following examples are provided for purposes of further illustrating the present invention and should not be construed as limiting the scope of the invention, which is defined by the claims.

EXAMPLE 1

A radiation-curable adhesive composition is prepared by combining 5.5 g of a cycloaliphatic epoxide (ERL-4221—Union Carbide Corporation), 17.2 g of a difunctional hydroxy-terminated polyurethane (TYCEL 7902—Lord Corporation), and 0.5 g of a photoinitiator (UVI 6990—Union Carbide Corporation). The resulting combination of ingredients is mixed by hand stirring to obtain a homogenous composition having an epoxy:hydroxy functional ratio of 5:1.

EXAMPLE 2

A radiation-curable adhesive composition is prepared according to Example 1 utilizing 5.2 g of the cycloaliphatic epoxide to achieve an epoxy:hydroxy functional ratio of 4:1.

The adhesive compositions of Examples 1 and 2 are utilized to bond transparent polyethylene film (SCLAIR SL1—E. I. Du Pont De Nemours & Co.) to aluminum foil. The adhesive composition is coated onto the aluminum foil at a weight of 2 lbs./ream and the coated foil is nipped to the polyethylene film by a laboratory laminator (Talboys Engineering Corporation). The resulting laminate is irradiated through the polyethylene film under two fusion lamps (300 watts/in.) in a UV curing oven (Fusion Systems, Inc.) at a belt speed of 25'/min. The resulting bonded laminate is tested for peel strength according to ASTM Test D1876-72. Testing is carried out immediately after cure, 24 hours after cure and 30 days after cure. The results are shown below in Table 1.

TABLE 1

| Example No. | Initial Peel Strength (lbs./in.) | 24-hour Peel Strength (lbs./in.) | 30-day Peel Strength (lbs./in.) |
|---|---|---|---|
| 1 | 3.3 | 3.1 | 2.8 |
| 2 | 3.1 | 2.8 | 3.0 |

EXAMPLE 3

A hydroxy-terminated polyurethane is prepared by reacting 125 g of diphenylmethane-4,4'-diisocyanate, 210 g of a polyether triol (TP 440, BASF Corporation) and 1020 g of a linear polyester (S1028-55, Ruco Corporation).

A radiation-curable adhesive composition is prepared by combining 1.1 g of a bisphenol-A epoxy resin (EPON 828—Shell Chemical Co.), 5.0 g of the hydroxy-terminated polyurethane resin prepared above, and 0.2 g of a photoinitiator (UVI 6990—Union Carbide Corporation). The resulting combination of ingredients is mixed by hand-stirring to obtain a homogenous composition having an epoxy:hydroxy functional ratio of 1:1. Two additional adhesive compositions are prepared in a similar manner utilizing 3.3 and 5.6 g of epoxy resin and 5.0 g and 5.0 g of hydroxy-terminated polyurethane, respectively, to achieve epoxy:hydroxy functional ratios of 3:1 and 5:1, respectively.

COMPARATIVE EXAMPLE 4

A radiation-curable adhesive composition is prepared in accordance with Example 3 except that an aromatic polyester (S1028-55—Ruco Corporation) is used as the hydroxy-functional material in lieu of the hydroxy-terminated polyurethane. The following gram amounts are utilized to achieve the corresponding epoxy:hydroxy functional ratios:

| Epoxy (g) | Aromatic Polyester (g) | Ratio |
| --- | --- | --- |
| 0.9 | 5.0 | 1:1 |
| 2.8 | 5.0 | 3:1 |
| 4.6 | 5.0 | 5:1 |

COMPARATIVE EXAMPLE 5

A radiation-curable adhesive composition is prepared in accordance with Example 3 except that an aliphatic polyester (S2011-55—Ruco Corporation) is used as the hydroxy-functional material in lieu of the hydroxy-terminated polyurethane. The following gram amounts are utilized to achieve the corresponding epoxy:hydroxy functional ratios:

| Epoxy (g) | Aliphatic Polyester (g) | Ratio |
| --- | --- | --- |
| 0.9 | 5.0 | 1:1 |
| 2.8 | 5.0 | 3:1 |
| 4.6 | 5.0 | 5:1 |

COMPARATIVE EXAMPLE 6

A radiation-curable adhesive composition is prepared in accordance with Example 3 except that polypropylene glycol (MW 2025) is used as the hydroxy-functional material in lieu of the hydroxy-terminated polyurethane. The following gram amounts are utilized to achieve the corresponding epoxy:hydroxy functional ratios:

| Epoxy (g) | Polypropylene Glycol (g) | Ratio |
| --- | --- | --- |
| 0.9 | 5.0 | 1:1 |
| 2.8 | 5.0 | 3:1 |
| 4.7 | 5.0 | 5:1 |

The adhesive compositions of Examples 3–6 are utilized to bond transparent polyethylene film to aluminum foil in accordance with the procedure described for Examples 1 and 2. Peel strength testing is carried out immediately after cure and 3 days after cure. The results are shown below in Table 2.

TABLE 2

| | Peel Strength (lb./in.) | | | | | |
| --- | --- | --- | --- | --- | --- | --- |
| | Epoxy:OH Ratio | | | | | |
| | 1:1 | | 3:1 | | 5:1 | |
| Hydroxy Compound | Initial | 3 Day | Initial | 3 Day | Initial | 3 Day |
| Example 3 | 2.2 | 3.0 | 3.0 | 3.1 | 3.6 | 3.0 |
| Comp. Example 4 | 2.8 | 2.0 | 1.1 | 0.5 | 0.8 | 0 |
| Comp. Example 5 | 0.4 | 0 | 0.3 | 0 | 0.5 | 0 |
| Comp. Example 6 | 0 | 0 | 0.3 | 0.1 | 0.4 | 0.3 |

As can be seen from the above data, hydroxy-terminated polyurethanes can be utilized to produce radiation-curable compositions having surprisingly superior adhesive performance as compared to compositions based on traditional hydroxy-functional polyesters or polyethers.

What is claimed is:

1. A radiation-curable composition comprising an epoxy compound, a hydroxy-terminated polyurethane and a photoinitiator wherein the hydroxy-terminated polyurethane is prepared by the reaction of at least one compound selected from the group consisting of polyesters and polyethers having a molecular weight of about 300 to about 10,000 and having at least two hydroxy groups with less than molar amounts of a low molecular weight diisocyante in a molar ratio of hydroxy group to isocyanate group ranging from about 1.01:1.00 to 3:1.

2. A composition according to claim 1 wherein the epoxy compound is an aliphatic, cycloaliphatic, aromatic, or heterocyclic epoxide, and wherein the epoxide can be of the monomeric or polymeric type.

3. A composition according to claim 2 wherein the epoxy compound is a cycloaliphatic epoxide selected from the group consisting of diepoxides of cycloaliphatic esters of dicarboxylic acids and 3,4-epoxycyclohexylmethyl-3,4-epoxycyclohexane carboxylates.

4. A composition according to claim 3 wherein the cycloaliphatic epoxide is 3,4-epoxycyclohexylmethyl-3,4-epoxycyclohexane carboxylate; bis(3,4-epoxycyclohexylmethyl)adipate; or mixtures thereof.

5. A composition according to claim 1 wherein the epoxy compound is a glycidylether of a polyhydric phenol.

6. A composition according to claim 1 wherein the epoxy compound is a copolymer of an acrylic acid ester of glycidol with one or more copolymerizable vinyl compounds.

7. A composition according to claim 1 wherein the polyester is prepared by the esterification of dicarboxylic acids or the transesterification of methyl esters of dicarboxylic acids with a dihydroxy compound.

8. A composition according to claim 7 wherein the dicarboxylic acids are selected from the group consisting of adipic acid, glutaric acid, pimelic acid, phthalic acid, terephathalic acid, naphthalene dicarboxylic acid, cyclohexane dicarboxylic acid, maleic acid, fumaric acid, hexene dicarboxylic acid, diglycolic acid, ethylether-2,2'-dicarboxylic acid, and thiodiglycolic acid.

9. A composition according to claim 7 wherein the dihydroxy compounds have 2 to 8 carbon atoms and are selected from the group consisting of ethylene glycol, propylene glycol, butylene-1,3-diol, butylene-1,4-diol, butylene-2,3-diol, 2,2-dimethylpropane-1,3-diol (neopentylglycol), 2,2-diethylpropane-1,3-diol, 2-methyl-2-propylpropane-1,3-diol, isomeric octanediols, heptenediol, butynediol, diethylene glycol, triethylene glycol, thioethylene glycol, diethanolamine, and N-methyl diethanolamine.

10. A composition according to claim 1 wherein the polyethers are prepared by splitting of water from a dihydroxy or trihydroxy compound of 2 to 8 carbon atoms or by ring-opening polymerization of an alkylene oxide.

11. A composition according to claim 10 wherein the dihydroxy compounds are selected from the group consisting of ethylene glycol, propylene glycol, butylene-1,3-diol, butylene-1,4-diol, butylene-2,3-diol, 2,2-dimethylpropane-1,3-diol (neopentylglycol), 2,2-diethylpropane-1,3-diol, 2-methyl-2-propylpropane-1,3diol, isomeric octanediols, heptenediol, butynediol, diethylene glycol, triethylene glycol, thioethylene glycol, diethanolamine, and N-methyl diethanolamine.

12. A composition according to claim 10 wherein the trihydroxy compound is selected from the group consisting of trimethylolpropane, gylcerol, and hexanetriol.

13. A composition according to claim 10 wherein the alkylene oxide is selected from the group consisting of ethylene oxide, propylene oxide, and tetrahydrofuran.

14. A composition according to claim 1 wherein the low molecular weight diisocyanate is an aliphatic or aromatic isocyanate and has from 6 to 40 carbon atoms.

15. A composition according to claim 14 wherein the diisocyanate is selected from the group consisting of hexane-1,6-diisocyanate, decane-1,10-diisocyanate, diisocyanates derived from dimerized fatty acids, phenylene-1,4-diisocyanate, toluene-2,4-diisocyanate, toluene-2,6-diisocyanate, naphthylene-1,5-diisocyanate, diphenylmethane-4,4'-diisocyanate, and diphenylmethane-3,3'-methoxy-4,4'-diisocyanate.

16. A composition according to claim 1 wherein the photoinitiator is selected from the group consisting of triarylsulfonium complex salts, aromatic sulfonium or iodonium salts of halogen-containing complex ions, aromatic onium salts of Group VIa elements, and aromatic onium salts of Group Va elements.

17. A composition according to claim 1 wherein the epoxy compound and the hydroxy-terminated polyurethane are present in an epoxy:hydroxy functional ratio ranging from about 1:1 to 20:1 and the photoinitiator is present in an amount ranging from about 1 to 10 percent by weight of the radiation-curable composition.

18. A composition according to claim 17 wherein the epoxy:hydroxy functional ratio ranges from about 1:1 to 7:1 and the photoinitiator is present in an amount ranging from about 1 to 5 percent by weight.

* * * * *